(12) United States Patent
Berthe et al.

(10) Patent No.: US 10,787,020 B2
(45) Date of Patent: Sep. 29, 2020

(54) SECURITY DEVICE WITH A LENS ARRAY COMPRISING SEVERAL ETCHED COLOUR PATTERNS

(71) Applicant: OBERTHUR TECHNOLOGIES, Colombes (FR)

(72) Inventors: Benoit Berthe, Colombes (FR); Coralie Vandroux, Colombes (FR)

(73) Assignee: IDEMIA FRANCE, Colombes (FR)

( * ) Notice: Subject to any disclaimer, the term of this patent is extended or adjusted under 35 U.S.C. 154(b) by 520 days.

(21) Appl. No.: 15/537,287

(22) PCT Filed: Dec. 16, 2015

(86) PCT No.: PCT/FR2015/053552
§ 371 (c)(1),
(2) Date: Sep. 13, 2017

(87) PCT Pub. No.: WO2016/097608
PCT Pub. Date: Jun. 23, 2016

(65) Prior Publication Data
US 2019/0152250 A1    May 23, 2019

(30) Foreign Application Priority Data
Dec. 17, 2014   (FR) ..................... 14 62657

(51) Int. Cl.
*B42D 25/40*    (2014.01)
*B42D 25/435*   (2014.01)
(Continued)

(52) U.S. Cl.
CPC ........... *B42D 25/435* (2014.10); *B42D 25/29* (2014.10); *B42D 25/324* (2014.10); *B42D 25/41* (2014.10); *G02B 30/27* (2020.01); *G07D 7/003* (2017.05)

(58) Field of Classification Search
CPC .... B42D 25/435; B42D 25/29; B42D 25/324; B42D 25/41; G02B 27/2214;
(Continued)

(56) References Cited

U.S. PATENT DOCUMENTS

| | | | |
|---|---|---|---|
| 2008/0284157 A1* | 11/2008 | Muke | B41M 3/14 283/86 |
| 2009/0214105 A1* | 8/2009 | van den Berg | B42D 25/23 382/154 |
| 2010/0103528 A1 | 4/2010 | Endle et al. | |

FOREIGN PATENT DOCUMENTS

| | | |
|---|---|---|
| DE | 10 2009 006301 A1 | 7/2010 |
| FR | 2 996 164 A1 | 4/2014 |

(Continued)

OTHER PUBLICATIONS

International Search Report, dated Mar. 10, 2016, from corresponding PCT/FR2015/053552 application.

*Primary Examiner* — William R Alexander
*Assistant Examiner* — Henry A Duong
(74) *Attorney, Agent, or Firm* — Nixon & Vanderhye

(57) ABSTRACT

A method for producing a security device (1) comprising a first colour pattern (A) visible along an associated viewing axis (Δα) and at least one second colour pattern (B) visible along an associated viewing axis (Δβ), comprising the following steps:—assembling an image layer (4) suitable for forming at least one colour pattern (A, B) by laser etching, on a support (3),—laser etching the first colour pattern (A) in the image layer (4), along the associated viewing axis (Δα) of same, in such a way that it can be seen through a lens array (7),—for each of said at least one second colour pattern (B), laser etching said at least one second colour pattern (A) in the image layer (4), along the associated
(Continued)

viewing axis (Δβ) of same, in such a way that it can be seen through a lens array (7). A security device (1) obtained by said method.

20 Claims, 1 Drawing Sheet

(51) Int. Cl.
*B42D 25/41* (2014.01)
*B42D 25/324* (2014.01)
*G02B 30/27* (2020.01)
*B42D 25/29* (2014.01)
*G07D 7/00* (2016.01)

(58) Field of Classification Search
CPC .. G02B 3/0037; G02B 3/0075; G02B 3/0043; G02B 3/0081; G02B 3/0087; G02B 27/0938; G02B 27/0944; G02B 2003/0093; G07D 7/003
USPC .......................................................... 359/620
See application file for complete search history.

(56) References Cited

FOREIGN PATENT DOCUMENTS

| | | |
|---|---|---|
| FR | 2 998 063 A1 | 5/2014 |
| WO | 2006/110038 A2 | 10/2006 |
| WO | 2011/045180 A | 4/2011 |
| WO | 2012/162041 A2 | 11/2012 |
| WO | 2013/098513 A1 | 7/2013 |

* cited by examiner

SECURITY DEVICE WITH A LENS ARRAY COMPRISING SEVERAL ETCHED COLOUR PATTERNS

BACKGROUND OF THE INVENTION

Field of the Invention

The present invention relates to a security device comprising a lenticular array in order to allow, selectively, depending on the direction of observation, at least two patterns to be viewed.

Such a security device is typically intended to be placed on a carrier, such as an identity document, in order to authenticate it. An identity document is a document related to its bearer, such as a national identity card, a passport, a social security card, a bank card, etc.

To this end, a security device is sought that is difficult to reproduce in order to make it difficult to manufacture or reproduce such a device. In addition, such a security device may advantageously be personalized in order to make it unique. The ability to produce at least one color pattern allows a security device to be complexified while improving its figurative capacities.

A lenticular array, also called a lenticular sheet, is composed of elementary lenses of identical optical properties, the lenticules, which have the particularity of having a focal length such that the back face, i.e. the smooth face, of the lenticular array is coincident with the focal plane of the lenticules. Each lenticule magnifies, in an image located under the lenticular array, an elementary zone that is located in the alignment of the eye and of the optical center of the lenticule.

DESCRIPTION OF THE RELATED ART

In order to produce a device comprising a plurality of patterns, at least two production techniques are known.

A first production technique, which is called the "pre-printed" technique makes it possible, by placing a specially adapted image under a lenticular array, to view various patterns, each pattern being individually visible along a specific viewing axis. It is thus possible to produce a composite image, adapted to the lenticular array under which it is placed, comprising n patterns. Each such pattern is visible along a viewing axis specific to the pattern, passage from one viewing axis to a neighboring viewing axis being achieved by rotation. Such an adapted image is typically produced separately in order to then be assembled with the lenticular array. The image, which is typically offset printed, and therefore the patterns, may be in color. In such a production technique the image is produced very early on in the manufacturing process, and advantageously favors a single image, this particularly making it very suitable for mass production. In contrast it is not adapted to personalization, which would preferably be tailored to the individual, involving modification of a pattern, at the last minute, for example to associate it with a bearer during a final reconfiguration.

In a second production technique, which is called the "post-etched" technique, it is even possible to produce a pattern, by etching, in an image layer. The etching is typically carried out by means of a beam, such as a laser beam. Said beam modifies the image layer, which is sensitive to this beam, by delivering energy. According to a first variant, the etching is carried out through the lenticular array. According to this first variant, said beam is oriented, relatively to the device, along a main axis that defines a viewing axis along which the pattern thus etched is then visible through the lenticular array. It is thus possible, by modifying the relative orientation between the device and the etching tool, between two successive etches, to produce multiple patterns, which are each visible separately along a specific viewing axis. According to a second variant, it is possible to carry out the etching in the absence of the lenticular array. In this variant, the etch is modified optically in order to simulate the presence of the lenticular array. Thus, for example, the firing angles are modified in order to reproduce the deviations that the lenticular array would cause. These two variants of the second production technique allow a pattern to be produced in one of the last manufacturing operations, including after integration of the lenticular array, this making them very suitable for personalization. However, because of the way in which the modification is achieved, by carbonization, laser etching allows only monochromatic patterns to be produced.

The above two production techniques i.e. the "pre-printed" and "post-etched" techniques, allow devices that are quite similar, in that they comprise n separate patterns, each visible along a viewing axis specific to the pattern, to be produced. Passage from a viewing axis of one pattern to the viewing axis of another is achieved by rotating the device by an amount dependent on a characteristic angle of the lenticular array. Fine analysis of a device however allows the way in which it was obtained to be determined with certainty.

BRIEF SUMMARY OF THE INVENTION

It would be highly desirable to be able to combine the advantages of these two production techniques: production of color patterns, with implementation on an almost finished device, during a final phase of the production process, or personalization phase. To achieve this, the present invention provides a security device and a process for manufacturing the same in which a pattern is produced, by laser etching, in color.

One subject of the invention is a process for manufacturing a security device comprising a first color pattern that is visible along an associated viewing axis and at least one second color pattern that is visible along an associated viewing axis, comprising the following steps: assembling an image layer, able to form at least one color pattern by laser etching, above a carrier; laser etching in the image layer the first color pattern, along its associated viewing axis ($\Delta\alpha$), in such a way that it may be seen through a lenticular array; for each of said at least one second color pattern, laser etching in the image layer said at least one second color pattern, along its associated viewing axis, in such a way that it may be seen through a lenticular array.

According to another feature, the process also comprises a step of assembling a lenticular array above the image layer.

According to another feature, an etching step is carried out in the absence of the lenticular array.

According to another feature, an etching step is carried out through the lenticular array.

According to another feature, the lenticular array is cylindrical, spherical, pyramidal or polyhedral.

According to another feature, the focal plane of the lenticular array is placed as close as possible to the image layer According to another feature, the image layer comprises a pixel matrix array, each pixel comprising a plurality of sub-pixels, each sub-pixel comprising a color and being able to be selectively activated or deactivated by means of a laser.

According to another feature, the image layer comprises a first matrix array of pixels, able to form a first pattern, and at least one second matrix array of pixels, able to form at least one second color pattern, said matrix arrays being interlaced.

According to another feature, the lenticular array is cylindrical, and wherein the one or more matrix arrays are linear and of axis secant to the axis of the lenticular array.

According to another feature, the angle between the axis of the one or more matrix arrays and the axis of the lenticular array (7) is equal to 90°+/−45° and preferably equal to 90°+/−5°.

According to another feature, the image layer also comprises an upper masking layer, which is placed between the pixel matrix array and the lenticular array, and which is sensitive to the laser, in order to be able to selectively deactivate a sub-pixel by etching an upper mask by means of a laser.

According to another feature, the image layer also comprises a lower masking layer, which is placed between the pixel matrix array and the carrier, and which is sensitive to the laser, in order to be able to selectively deactivate a sub-pixel by etching a lower mask by means of a laser.

According to another feature, a sub-pixel is sensitive to the laser, in order to be able to be selectively activated/selectively deactivated, respectively.

According to another feature, the lenticular array is insensitive to the laser.

According to another feature, a guard, that is insensitive to the laser, is arranged under the lenticular array, said guard having a thickness such that it includes any intersection between a viewing axis and a viewing axis.

According to another feature, the first pattern is different from said at least one second pattern.

According to another feature, each of said at least one second pattern reproduces the first pattern spatially offset in order to simulate a movement of the pattern.

According to another feature, said at least one second pattern reproduces the first pattern with at least one different color in order to simulate a variation in color.

The invention also relates to a security device obtained via such a process.

BRIEF DESCRIPTION OF THE DRAWINGS

Other features, details and advantages of the invention will become more clearly apparent from the detailed description given below by way of indication with reference to the drawings, in which.

DETAILED DESCRIPTION OF THE PREFERRED EMBODIMENTS

Figure 1:
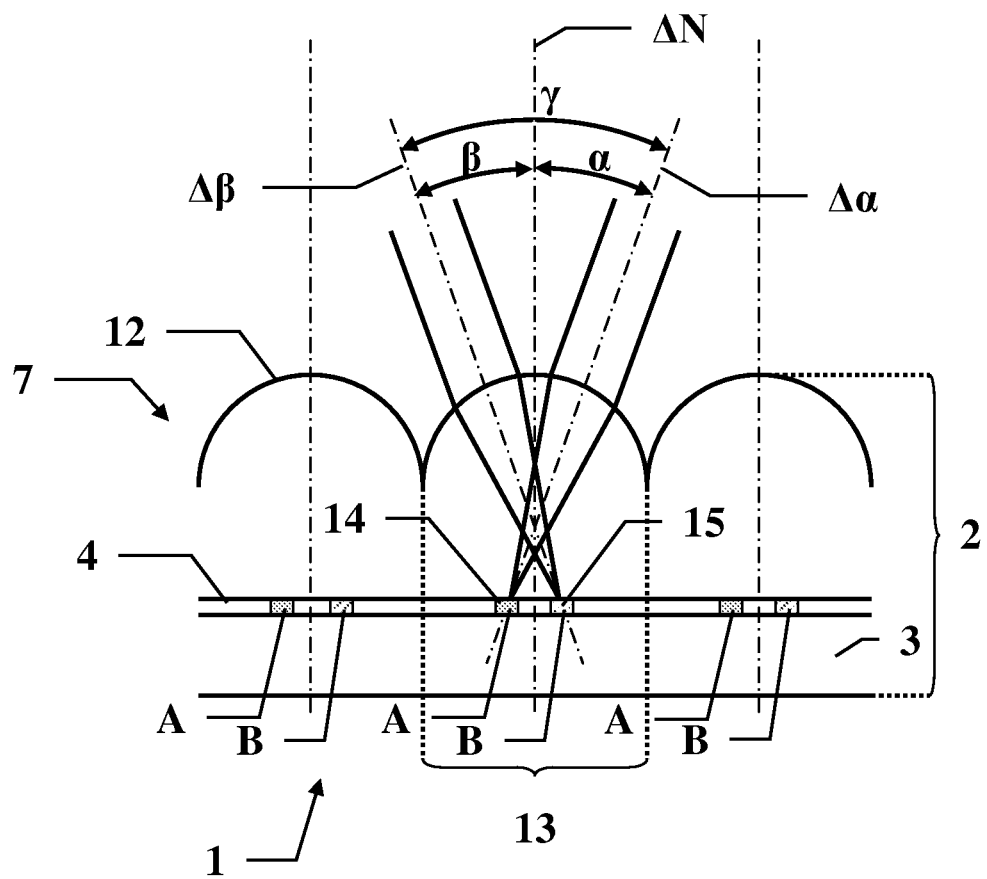
FIG. 1 shows a schematic diagram of a device comprising multiple patterns and based on a lenticular array.

Such as illustrated in FIG. 1, a lenticular array 7 comprises a periodic succession of lenticules 12, each having a substantially semicircular profile.

It is possible to produce lenticular arrays 7 of various types. A first type is a cylindrical lenticular array 7. In a cylindrical lenticular array 7 each lenticule 12 has a substantially semicylindrical profile. The cylindrical lenticules 12 are parallel to one another. Each lenticule 12 magnifies an elementary zone of strip shape, of width corresponding to the width of a lenticule 12, of an image located under the lenticular array 7.

Another type of lenticular array, called a pyramidal lenticular array, is obtained by crossing, in a given plane, two such cylindrical lenticular arrays. In such an array, the lenticules 12 are substantially cubic with four rounded upper edges. Such a lenticule 12 has a square shape in the plane of the lenticular array 7 and a semicircular shape in the two perpendicular planes passing through the two axes of the cylinders, respectively. The lenticules 12 are organized in a square matrix array. Each lenticule 12 magnifies an elementary zone or pixel, of two-sided square shape/two-part cruciform shape, the widths of the two sides/parts corresponding to the width of a lenticule 12, of an image located under the lenticular array 7.

Generalizing, another type of lenticular array 7, called a polygonal array, is obtained by crossing in a given plane, n such cylindrical lenticular arrays 7. In such an array, the lenticules 12 are substantially 2n-sided polygons with 2n rounded upper edges. Such a lenticule 12 has a 2n-sided polygonal shape in the plane of the lenticular array 7 and a semicircular shape in the n perpendicular planes passing through the n axes of the cylinders, respectively. The lenticules 12 are organized in a matrix array. Each lenticule 12 magnifies an elementary zone or pixel, of 2n-sided polygonal shape/2n-part cruciform shape, the widths of the 2n sides/parts corresponding to the width of a lenticule 12, of an image located under the lenticular array 7.

Considering the case where n is infinite, a spherical lenticular array 7 is obtained. In such a spherical array the lenticules 12 are substantially hemispherical. Such a lenticule 12 has a circular shape in the plane of the lenticular array 7 and a semicircular shape in any plane perpendicular to the plane of the lenticular array 7. The lenticules 12 are typically organized in a square matrix array (in a chequerboard arrangement) or hexagonal matrix array (in a honeycomb arrangement). Each lenticule 12 magnifies an elementary zone or pixel, of circular shape of diameter corresponding to the width/to the diameter of a lenticule 12, of an image located under the lenticular array 7.

The invention is applicable to any type of lenticular array 7.

FIG. 1, which is one-dimensional, is thus applicable to any type of lenticular array 7. It shows a cross-section cut along a plane normal to the surface of the lenticular array 7. In the case of a cylindrical lenticular array 7, the cross-section is perpendicular to an axis Δ of extension of the cylinders.

Under the lenticular array 7 is placed an image layer 4. This image layer 4 is periodically divided into sections 13, each section 13 corresponding to a lenticule 12 and being substantially facing a lenticule 12. Each section 13 comprises segments 14-15 of patterns A, B.

FIG. 1 illustrates an example with two patterns A, B, but it is possible to have more patterns.

Because of the shape of the lenticule 12, an observer sees the segments 14 of a first pattern A when he looks along a first viewing axis Δα. From all the segments 14 of all the sections 13 of a device 1, the eye reconstructs the first pattern A. Likewise, an observer sees the segments 15 of a second pattern B when he looks along a second viewing axis Δβ. From all the segments 15 of all the sections 13 of a device 1, the eye reconstructs the second pattern B. In order that a segment 14 of the first pattern A and a segment 15 of the second pattern B do not superpose, with the risk of adversely affecting the rendering of one of the patterns A, B, it is recommended to respect a characteristic angle γ of the lenticular array 7 between the orientation α of the first viewing axis Δα and the orientation β of the second viewing axis Δβ. If the first viewing axis Δα and the second viewing axis Δβ make, with respect to a reference, such as the normal ΔN to the surface of the device 1, an angle α and an angle β, respectively, the angle β-α between the first viewing axis Δα and the second viewing axis Δβ is a multiple of γ.

The "pre-printed" production technique allows color patterns to be produced, but is not suitable for personalization, thus this production technique is not retained.

The "post-etched" production technique uses an image layer 4 that is modifiable, in that it is sensitive to the laser. Etching is typically carried out by means of a beam, such as a laser beam, directly on an image layer 4 without a lenticular array, or through said lenticular array 7 assembled above the image layer 4. The etching may in this second case advantageously be carried out a posteriori, i.e. after the lenticular array 7 and the various layers 3, 4 have been assembled, on the completed assembly.

By varying the position and intensity of the beam, the etching modifies, by delivering energy, the modifiable image layer 4 and produces at least one pattern A, B, by etching the corresponding segments 14, 15.

In the case where the lenticular array 7 is placed above the image layer 4, it is possible to carry out the etching through the lenticular array 7. A lenticule 12 is here used optically, the optical path being the reverse of that used for viewing. However, such a path is symmetric, and by orienting the beam, relatively to the device 1, along a main axis during the etching of a pattern A or B, this main etching axis determines a viewing axis Δα or Δβ along which said pattern A or B thus etched will then be visible, respectively. Thus a pattern A and a pattern B, visible from a viewing axis Δα and Δβ, respectively, must be etched while orienting the etching beam along said viewing axis Δα and Δβ, respectively. With reference to FIG. 1, a beam oriented along the first axis Δα, etches, in a modifiable image layer 4, a segment 14 of a first pattern A. This first pattern A will then be visible along this first axis Δα. Analogously, a beam oriented along the second axis Δβ etches, in a modifiable image layer 4, a segment 15 of a second pattern B. This second pattern B will then be visible along this second axis Δβ.

It is thus possible, by modifying the orientation of the device 1 or of the etching beam by an angle γ between two etches, to produce multiple distinct patterns A, B that are visible separately each along a specific viewing axis, without interference between the patterns A, B.

In the case where the lenticular array 7 is not present during the etching, its presence is simulated by correcting the firing angles of the etching beam, such as they would be deviated by the lenticular array 7. Thus, subsequent placement of the lenticular array 7 above the image layer, under the positional and orientational conditions used for the simulation, makes it possible to make the patterns A, B appear.

In the prior art, because of the way in which the modification of the image layer 4 is achieved, by carbonization, laser etching allows only monochromatic patterns to be produced. Typically, the etching beam burns the image layer 4, which is for example made of transparent carbon-enriched polycarbonate. This burning causes carbon black to appear. A modulation of the power of the beam allows a wide variety of gray levels to be produced.

In order to be able to etch a color pattern, the invention advantageously replaces the image layer of the prior art, which is solely burnable in monochrome, with an image layer 4 able to form a color pattern by laser etching.

The invention relates to a process for manufacturing a security device 1. The device 1 comprises a first color pattern A that is visible along an associated viewing axis Δα. The device 1 also comprises at least one second color pattern B that is visible along an associated viewing axis Δβ. In practice, it is possible to divide a section 13 corresponding to a lenticule 12 into up to four distinguishable patterns.

The process comprises the following steps. A first step consists in assembling in order: a receiving carrier 3 providing stiffness to the device 1 and an image layer 4 able to form at least one color pattern by laser etching. These various plastic layers may thus be assembled by any process, such as adhesive bonding or even lamination, typically hot lamination.

All the preceding steps may be carried out in series in order to produce, in bulk, devices 1 for which all that there remains to do is carry out the personalization step. The personalization step advantageously comprises the production of the color patterns A, B by means of laser etching, carried out on the almost finished product.

The laser etching may be carried out through the lenticular array 7, if it is assembled, or in its absence, in the case where it is assembled subsequently. A first color pattern A is etched along its associated viewing axis Δα, in the image layer 4. For each of said at least one second color pattern B, laser etching is likewise performed along the specific viewing axis Δβ associated with each pattern B, in the image layer 4. Whether the lenticular array 7 be present or absent, the etching of the color patterns A, B is carried out in such a way that, once a lenticular array 7 has actually been put in place above the image layer 4, each of the patterns A, B may be seen through said lenticular array 7.

If the lenticular array 7 is absent during the etching, the etching, in terms of firing angles, is adapted in order to simulate the presence of the lenticular array 7. Thus, in the absence of the lenticular array 7, the angles of incidence of the etching beam on the image layer 4 are simulated. This simulation modifies them so that they are equal to the angles that would be obtained, deviated by the lenticular array 7. The process also comprises a subsequent step of assembling the lenticular array 7 above the image layer 4, the array being positioned and oriented in accordance with what was simulated.

If the lenticular array 7 is present during the etching, the etching is conventionally carried out, as in the monochromatic case, through said lenticular array 7. The lenticular array 7 may be present and assembled. Alternatively, it may be present during the etching and not be assembled. In the latter case, an assembly step is carried out subsequently.

The lenticular array 7 may be of any type. Thus, it may be cylindrical, spherical, pyramidal or polyhedral.

Figure 2:
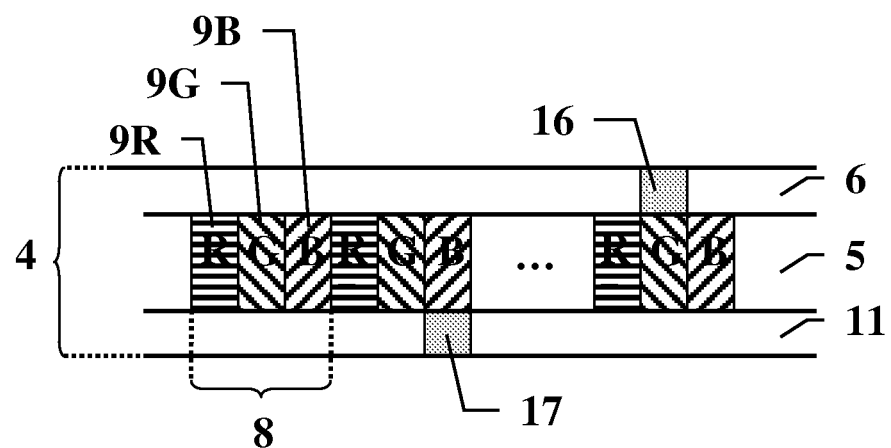
FIG. 2 shows an enlarged detail of an image layer able to be etched in color.

In order that, by laser etching, it be possible to produce a color pattern A, B, the image layer 4 comprises a pixel matrix array 5. FIG. 2 illustrates one embodiment of an image layer 4 comprising such a pixel matrix array 5. The arrangement and content of a pixel 8 may vary according to various embodiments. However, generically, in each and every case, each pixel 8 comprises a plurality of sub-pixels. A sub-pixel 9 is characterized in that it comprises a single elementary color and in that it is able to be selectively activated, so as to express said elementary color, or to be deactivated, so as to hide said elementary color.

Just as with monochromatic laser etching, the activation or deactivation of a sub-pixel may be gradual and thus allow graduated levels of expression of each elementary color.

The pixel matrix array 5 may have any layout, and a pixel 8 may have any shape and content, the shape and content of the pixels possibly being constant or varying from one pixel 8 to the next. The elementary colors are advantageously chosen from a color space, in order to make it possible, by combination, to express a wide variety of resulting hues. Thus, in the illustrated example, a pixel 8 comprises three sub-pixels, generically referenced 9, and each associated with a color chosen from Red (R), Green (G) and Blue (B). In this example a sub-pixel 9R comprises the color red, a sub-pixel 9G comprises the color green and a sub-pixel 9B comprises the color blue. A sub-pixel 9 and a single of each pixel 8 is associated with each of the colors and one alone.

Alternatively to the preceding example, using an RGB color space, another color space, such as the Cyan, Magenta, Yellow (CMY) color space, or more than three elementary colors, such as in the RGBW, RGBK, CMYW and CMYK color spaces (addition of white or black), may be used. A pixel 8 may even comprise a plurality of sub-pixels 9 of redundant colors. Thus, to produce a pattern A, B with a high red density, pixels 8 comprising 1 green sub-pixel, 1 blue sub-pixel and 2 red sub-pixels are advantageously possible.

On the basis of such an image layer 4, since the layout of the pixel matrix array 5 is known, it is possible to produce a color pattern A, B by activating and/or deactivating the colors comprised in the sub-pixels 9 selectively, typically by means of a laser. Thus it is possible to express, for each pixel 8, additively (activation) or subtractively (deactivation) a hue i.e. a combination of the colors of its sub-pixels 9, and thus produce a color pattern A, B by laser etching.

In order to obtain an optimal rendering of the colors, it should be noted that the image layer 4 and more precisely the pixel matrix array 5 is coincident with the focal plane of the lenticular array 7. Practically, the image layer 4, and thus the pixel matrix array 5, is advantageously placed as close as possible to said focal plane.

The image layer 4 may comprise a single matrix array, and the etching of the various patterns A, B may be carried out indifferently in the pixels present in the zones 14, 15 defined by the lenticular array 7 in relation with the axes $\Delta\alpha$ and $\Delta\beta$.

Alternatively, the image layer 4 may comprise a pixel matrix array dedicated to each of the color patterns A, B. Thus the image layer 4 comprises a first pixel matrix array, able to form the first color pattern A, and at least one second pixel matrix array, able to form each of said at least one second color pattern B. In this case, because of the interlacing of the pattern sectors 14, 15, which is connected with the lenticular array 7 and the division into lenticules, said matrix arrays are correspondingly interlaced.

It is also recommended that said matrix arrays be placed, relatively to the lenticular array 7, according to certain geometric relationships. Thus in the case of a cylindrical lenticular array 7, the pixel matrix arrays are advantageously also linear. It is recommended, so that the patterns A, B may be seen, and where appropriate etched, through the lenticular array 7, that the axis of the lenticular array 7 not be coincident with the axis of the rows of the pixel matrix arrays. Thus, the axis of the one or more pixel matrix arrays is advantageously secant to the axis of the cylindrical lenticules of the lenticular array 7. Provided that the two axes are secant, feasibility is achieved. However, this condition is all the better met if the two axes are perpendicular.

Thus, it is preferable for the angle between the axis of the one or more matrix arrays and the axis of the lenticular array 7 to be equal to 90°+/−45° and more preferably that it be equal to 90°+/−5°.

According to a first embodiment, the activation or deactivation is carried out, using the laser, directly in the pixel matrix array 5. An activation is thus possible for a sub-pixel 9 comprising a color that is expressed, advantageously with an intensity proportional to the energy emitted by the laser beam, when it receives energy from the laser. This is envisionable with a heat- or light-activatable ink or pigment. In contrast, a deactivation is possible for a sub-pixel 9 comprising a ink or pigment, for example thermolabile ink or pigment.

According to another embodiment, all the colors of the sub-pixels 9 of the pixels 8 of the pixel matrix array 5 are expressed. The image layer 4 also comprises an upper masking layer 6, which is placed above the pixel matrix array 5, i.e. between the pixel matrix array 5 and the lenticular array 7. This upper masking layer 6 is sensitive to the laser, in the manner of a layer according to the prior art, and is able to be etched in monochrome. Thus, by means of the laser, it is possible to selectively produce an upper mask 16, of opacity proportional to the modulable energy transmitted by the laser, plumb with each sub-pixel 9. This thus allows, subtractively, an (unmasked) resulting hue to be defined for each pixel 8 and thus a color pattern A, B to be produced.

According to another alternative or complementary embodiment, all the colors of the sub-pixels 9 of the pixels 8 of the pixel matrix array 5 are expressed and the image layer 4 also comprises a lower masking layer 11, placed above the pixel matrix array 5, i.e. between the pixel matrix array 5 and the carrier 3. This lower masking layer 11 is sensitive to the laser, in the manner of a layer according to the prior art, and is able to be etched in monochrome. Thus, by means of the laser, it is possible to selectively produce a lower mask 17, of opacity proportional to the modulable energy transmitted by the laser, plumb with each sub-pixel 9. This thus allows, subtractively, an (unmasked) resulting hue to be defined for each pixel 8 and thus a color pattern A, B to be produced.

An upper mask 16 masks a color by getting between the color and the eye. A lower mask 17 masks a color by absorbing light, which cannot reflect from the carrier 3.

In these two embodiments, the pixel matrix array 5 may advantageously not be sensitive to the laser.

In the embodiment in which the laser etching is carried out through the lenticular array 7, the laser beams ensuring the production of the various patterns A, B may cross in said lenticular array 7 or in a certain thickness located just below. Furthermore, it is important for the lenticular array 7 to be insensitive to the laser. Also advantageously, a guard, which is insensitive to the laser, is arranged under the lenticular array 7. This guard is such that it has a thickness such that it includes any intersection between a laser beam along a viewing axis $\Delta\alpha$ and a laser beam along a viewing axis $\Delta\beta$.

Thus, no parasitic etching, corresponding to a plurality of possibly mixed patterns A, B and clouding the visibility of the patterns A, B, occurs in the lenticular array 7 or in the guarding thickness located immediately below.

The invention relates to a security device 1 obtained via this process.

Such a security device 1 is advantageous mainly in that it allows multiple color images to be produced, by etching, i.e. in one of the last manufacturing steps of a device 1, thus making personalization possible.

According to one important feature of the invention, the first pattern A is different from said at least one second pattern B. This advantageously allows, in the same security device 1, at least two pieces of information to be placed in the same location, thus guaranteeing a space saving and compactness. Thus, for example, for a security device 1 integrated into a travel document such as a passport, it is possible to include in the security device 1, the surname, name and a color passport photograph of the holder. This is achieved by etching, particularly suited to the personalization phase.

According to one embodiment, it is also possible for the second pattern B and the following to reproduce, spatially offset, the first pattern A, in order to simulate a movement of the pattern and to produce a cinematic animation.

Specifically to the invention, it is now possible to produce color-based animations. Thus, it is possible for the second pattern B and the following to reproduce the first pattern A with at least one different color, in order to simulate a variation in color and thus produce a colored animation.

It is of course possible to combine these two embodiments and produce a colored cinematic animation.

The invention claimed is:

1. A process for manufacturing a security device (1) comprising a first color pattern (A) that is visible along an associated viewing axis ($\Delta\alpha$) and at least one second color pattern (B) that is visible along an associated viewing axis ($\Delta\beta$), the process comprising:
assembling an image layer (4), able to form at least one color pattern (A, B) by laser etching, above a carrier (3);
laser etching in the image layer (4) the first color pattern (A), along its associated viewing axis ($\Delta\alpha$), in such a way that it may be seen through a lenticular array (7); and
for each of said at least one second color pattern (B), laser etching in the image layer (4) said at least one second color pattern (B), along its associated viewing axis ($\Delta\beta$), in such a way that it may be seen through a lenticular array (7),
wherein the image layer (4) comprises a pixel matrix array (5), each pixel (8) comprising a plurality of sub-pixels, each sub-pixel (9) comprising a color and being able to be selectively activated or deactivated by means of a laser.

2. The process as claimed in claim 1, also comprising a step of assembling a lenticular array (7) above the image layer (4).

3. The process as claimed in claim 2, wherein an etching step is carried out in the absence of the lenticular array (7).

4. The process as claimed in claim 2, wherein an etching step is carried out through the lenticular array (7).

5. The process as claimed in claim 2, wherein the lenticular array (7) is cylindrical, spherical, pyramidal or polyhedral.

6. The process claim 2, wherein the focal plane of the lenticular array (7) is placed as close as possible to the image layer (4).

7. The process as claimed in claim 2, wherein the lenticular array (7) is insensitive to the laser.

8. The process as claimed in claim 2, wherein a guard, that is insensitive to the laser, is arranged under the lenticular array (7), said guard having a thickness such that said guard includes any intersection between a viewing axis ($\Delta\alpha$) and a viewing axis ($\Delta\beta$).

9. The process as claimed in claim 1, wherein the image layer (4) comprises a first matrix array of pixels, able to form the first color pattern (A), and at least one second matrix array of pixels, able to form the at least one second color pattern (B), said first and at least one second matrix arrays being interlaced.

10. The process as claimed in claim 1, wherein the lenticular array (7) is cylindrical, and wherein the one or more matrix arrays are linear and of axis secant to the axis of the lenticular array.

11. The process as claimed in claim 10, wherein the angle between the axis of the one or more matrix arrays and the axis of the lenticular array (7) is equal to 90°+/−45°.

12. The process as claimed in claim 1, wherein the image layer (4) also comprises an upper masking layer (6), which is placed between the pixel matrix array (5) and the lenticular array (7), and which is sensitive to the laser, in order to be able to selectively deactivate a sub-pixel (9) by etching an upper mask (16) by means of the laser.

13. The process as claimed in claim 1, wherein the image layer (4) also comprises a lower masking layer (11), which is placed between the pixel matrix array (5) and the carrier (3), and which is sensitive to the laser, in order to be able to selectively deactivate a sub-pixel (9) by etching a lower mask (17) by means of the laser.

14. The process as claimed in claim 1, wherein a sub-pixel (9) is sensitive to the laser, in order to be able to be selectively activated/selectively deactivated, respectively.

15. The process as claimed in claim 1, wherein the first color pattern (A) is different from said at least one second color pattern (B).

16. The process as claimed in claim 1, wherein each of said at least one second color pattern (B) reproduces the first color pattern (A) spatially offset in order to simulate a movement of the pattern.

17. The process as claimed in claim 1, wherein said at least one second color pattern (B) reproduces the first color pattern (A) with at least one different color in order to simulate a variation in color.

18. A security device (1) obtained via the process as claimed in claim 1.

19. A process for manufacturing a security device (1) comprising a first color pattern (A) that is visible along an associated viewing axis ($\Delta\alpha$) and at least one second color pattern (B) that is visible along an associated viewing axis ($\Delta\beta$), the process comprising:
assembling an image layer (4), able to form at least one color pattern (A, B) by laser etching, above a carrier (3);
laser etching in the image layer (4) the first color pattern (A), along its associated viewing axis ($\Delta\alpha$), in such a way that it may be seen through a lenticular array (7); and
for each of said at least one second color pattern (B), laser etching in the image layer (4) said at least one second color pattern (B), along its associated viewing axis ($\Delta\beta$), in such a way that it may be seen through a lenticular array (7), wherein each of said at least one second color pattern (B) reproduces the first color pattern (A) spatially offset in order to simulate a movement of the pattern.

20. A process for manufacturing a security device (1) comprising a first color pattern (A) that is visible along an associated viewing axis ($\Delta\alpha$) and at least one second color pattern (B) that is visible along an associated viewing axis ($\Delta\beta$), the process comprising:
assembling an image layer (4), able to form at least one color pattern (A, B) by laser etching, above a carrier (3);
laser etching in the image layer (4) the first color pattern (A), along its associated viewing axis ($\Delta\alpha$), in such a way that it may be seen through a lenticular array (7); and for each of said at least one second color pattern (B), laser etching in the image layer (4) said at least one second color pattern (B), along its associated viewing axis (Δβ), in such a way that it may be seen through a lenticular array (7), wherein said at least one second color pattern (B) reproduces the first color pattern (A) with at least one different color in order to simulate a variation in color.

\* \* \* \* \*